(12) United States Patent
Gärtner et al.

(10) Patent No.: US 12,296,771 B2
(45) Date of Patent: May 13, 2025

(54) AIRBAG DEVICE FOR ARRANGING ON A BACKREST PART OF A MOVEABLE SEAT DEVICE OF A MOTOR VEHICLE, AND SEAT DEVICE

(71) Applicant: MERCEDES-BENZ GROUP AG, Stuttgart (DE)

(72) Inventors: Eric Gärtner, Stuttgart (DE); Claus Geisler, Herrenberg (DE); Lutz Quarg, Boeblingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/294,689

(22) PCT Filed: Aug. 2, 2022

(86) PCT No.: PCT/EP2022/071750
§ 371 (c)(1),
(2) Date: Feb. 2, 2024

(87) PCT Pub. No.: WO2023/012187
PCT Pub. Date: Feb. 9, 2023

(65) Prior Publication Data
US 2024/0343218 A1 Oct. 17, 2024

(30) Foreign Application Priority Data

Aug. 5, 2021 (DE) ............. 10 2021 004 054.6

(51) Int. Cl.
*B60R 21/233* (2006.01)
*B60R 21/207* (2006.01)
*B60R 21/231* (2011.01)

(52) U.S. Cl.
CPC .......... *B60R 21/207* (2013.01); *B60R 21/233* (2013.01); *B60R 2021/23153* (2013.01); *B60R 2021/23308* (2013.01)

(58) Field of Classification Search
CPC ... B60R 21/207; B60R 21/231; B60R 21/233; B60R 2021/23153; B60R 2021/23308
(Continued)

(56) References Cited

U.S. PATENT DOCUMENTS

| 8,651,522 B2 | 2/2014 | Hirth et al. |
| 11,529,926 B2 | 12/2022 | Sapountzis et al. |

(Continued)

FOREIGN PATENT DOCUMENTS

| DE | 19540911 A1 | 5/1997 |
| DE | 102007052246 A1 | 5/2009 |

(Continued)

OTHER PUBLICATIONS

International Search Report and Written Opinion mailed Dec. 13, 2022 in related/corresponding International Application No. PCT/EP2022/071750.

(Continued)

*Primary Examiner* — Jason D Shanske
*Assistant Examiner* — Daniel M. Keck
(74) *Attorney, Agent, or Firm* — PATENT PORTFOLIO BUILDERS PLLC

(57) ABSTRACT

An airbag device arranged on a backrest part of a moveable seat device of a motor vehicle includes first and second gas bags. The first gas bag is deployed into a receiving position by a deployment unit of the airbag device responsive to an actuation signal. In the receiving position the first gas bag is designed to receive a body part of an occupant of the motor vehicle, the occupant facing the backrest part. The second (Continued)

gas bag, at least in the receiving position, is deployed between the backrest part and the first gas bag.

8 Claims, 1 Drawing Sheet

(58) Field of Classification Search
USPC ............................................................ 280/729
See application file for complete search history.

(56) References Cited

U.S. PATENT DOCUMENTS

| | | |
|---|---|---|
| 2015/0343986 A1 | 12/2015 | Schneider et al. |
| 2017/0361800 A1 | 12/2017 | Ohachi et al. |
| 2018/0043852 A1* | 2/2018 | Fischer ................ B60R 21/231 |
| 2019/0061668 A1* | 2/2019 | Zhang ................ B60R 21/2338 |
| 2019/0077356 A1 | 3/2019 | Patel et al. |
| 2019/0111878 A1 | 4/2019 | Faruque et al. |

FOREIGN PATENT DOCUMENTS

| | | |
|---|---|---|
| DE | 102008037810 A1 | 5/2009 |
| DE | 202018101242 U1 | 7/2019 |
| EP | 2581276 A1 | 4/2013 |
| EP | 3470273 A1 | 4/2019 |
| WO | 2016064936 A1 | 4/2016 |

OTHER PUBLICATIONS

Office Action created May 2, 2022 in related/corresponding DE Application No. 10 2021 004 054.6.
Office Action dated Apr. 1, 2025 in related/corresponding EP Application No. 22 761 973.1.

* cited by examiner

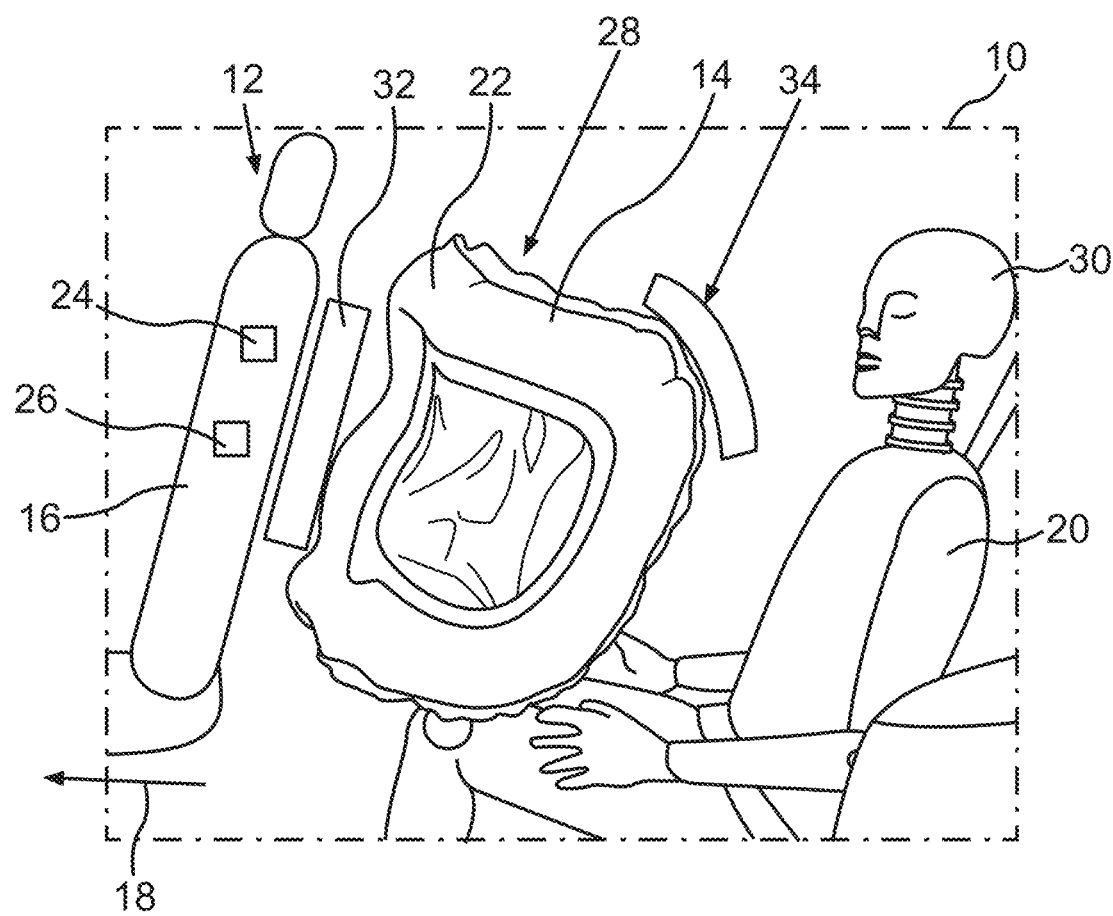

AIRBAG DEVICE FOR ARRANGING ON A BACKREST PART OF A MOVEABLE SEAT DEVICE OF A MOTOR VEHICLE, AND SEAT DEVICE

BACKGROUND AND SUMMARY OF THE INVENTION

Exemplary embodiments of the invention relate to an airbag device for arranging on a backrest part of a moveable seat device of a motor vehicle, as well as to a seat device with a corresponding airbag device.

Airbag devices are already known from the prior art which are designed, for example, for a driver of a motor vehicle or passenger of a motor vehicle. The motor vehicle may furthermore also have what is referred to as a back area, wherein people who are in the back area can likewise be protected through what are referred to as back airbags. These airbags may, for example, be what are referred to as tubular structure airbags (RSB) that are installed in the backrest of the front seat. In the event of a frontal impact, this airbag device reduces the loads acting on a person sitting in the back in the outer rear seats. The distance between the airbag device and the person sitting in the back may vary here as a result of the fact that the front seat is moveable longitudinally. The effective range of the back airbag is always the same with respect to the backrest. If the front seat is moved, the effective range of the airbag device moves too. Therefore, if the front seat is in its foremost position, it may be the case that, depending on the weight and physical dimensions of the occupant, they have no interaction with the airbag device at all.

DE 10 2008 037810 A1 describes how the protective effect of airbags is supposed to be improved, in particular, in the event of a glancing impact or in the event of an off-center load. For this purpose, a vehicle occupant safety system or restraint system with a gas bag, which possesses a predefined supporting force distribution when in the filled or deployed state, and at least one energy-absorbing element is proposed that is attached to the gas bag in order to deploy the gas bag or locally increase its supporting force. The energy-absorbing element or elements are arranged such that at least one energy-absorbing element can be placed against an occupant and at least partially follow them at least within the limits of their movements and has an occupant-protecting function and/or such that the gas bag has a funnel function with respect to an occupant to be protected. Through this funnel function, the occupant is guided to the center of the airbag and if applicable also protected on the side by the sidewalls in the event of an impact.

DE 10 2007 052 246 A1 relates to an airbag, in particular for a car, with a support structure that is moveable out of a storage position into a restraining position, with a cover surrounding a restraining volume of the airbag formed by the support structure in its restraining position, and with at least one connection element extending within the restraining volume by means of which hollow bodies of the support structure and/or surface areas of the cover are connected to one another.

Exemplary embodiments of the present invention are directed to an airbag device and a seat device by means of which improved protection of an occupant, in particular in a back area of the motor vehicle, can be achieved.

One aspect of the invention relates to an airbag device for arranging on a backrest part of a moveable seat device of a motor vehicle, comprising at least a first gas bag that is deployed into a receiving position by a deployment unit of the airbag device according to an actuation signal, wherein in the receiving position the gas bag is designed to receive a body part of an occupant of the motor vehicle, wherein the occupant is facing the backrest part.

Provision is made for the airbag device to have a second gas bag that at least in the receiving position is deployed between the backrest part and the first gas bag.

In particular, this ensures that the occupant in the back area is still reliably protected in the event of an impact even with different adjustment positions of the moveable seat device. In particular, the first gas bag on the backrest part is, so to speak, turned towards the occupant who, in particular, is in what is referred to as the back area of the motor vehicle. In the event of a frontal impact, a body part, for example a head of the occupant, then moves in the direction of the backrest part, wherein the body part can then be received by at least the first gas bag and/or the second gas bag. The second gas bag therefore, in particular, bridges the moveable longitudinal portion of the motor vehicle. It can therefore be ensured that, even if the seat device is in a foremost position relative to the back area or relative to the occupant, the occupant can still be reliably received by the airbag device.

The second gas bag can, in particular, be designed as what is referred to as a conventional airbag device or conventional gas bag that is inflated, in particular, between the backrest part and the first gas bag, as a result of which the, in particular, already filled first gas bag, including its effective range, is moved in the direction of the occupant and the load on the occupant is reduced there. If the distance between occupant and front seat is large, then the first gas bag can freely deploy and the additional second gas bag can move the first gas bag in the direction of the occupant. If the distance between the occupant and the front seat is very small, then the second gas bag does not deploy completely, but the additional first gas bag deploys in any case. This combination is always able here to reduce the loads on the occupant and, if need be, prevent any head contact with the seat.

According to one advantageous embodiment, at least the first gas bag is designed as a tubular structure bag. In particular, the first gas bag is, in particular, a tubular structure airbag. The tubular structure gas bag or the tubular structure airbag consists here of an actively filled tubular structure and a valve film surrounding the airbag cover and with the aid of the surrounding air deploys an airbag with conventional volume. As a result of these properties, the latter deploys only to a reduced extent on contact with obstacles. This means that, if a tube hits an obstacle upon filling, it moves out of the way, the airbag then cannot fill up completely and a smaller volume is formed. However, through the second gas bag, it is possible to ensure that receiving can still reliably be carried out even if the tubular structure bag does not deploy or does not deploy fully. In particular, a support structure is therefore generated in the receiving position by the tubular structure bag that is surrounded by a cover fillable either with surrounding air or else with a pressurized gas. In other words, the deployment of the airbag is achieved here through the support structure, which is enlarged by means of a corresponding gas or mechanically. The cover body or the mechanical components are connected to one another to form a framework or to a truss or the like here. If, for example, an occupant of a seat in a passenger car hits the airbag during the course of an accident scenario, then the best possible restraining effect should be achieved. In particular, if surrounding air is trapped in the support structure or the associated cover, the restraining effect is maximized, for example, by the fact that at least one connection element extending within the restraining volume is provided that is connected to the support structure and/or the cover. This is particularly important since, at the time the occupant strikes it, the restraining volume or its internal pressure is in principle rather lower than in conventional airbags. The internal pressure for the purposes of restraining is mainly generated by the passenger themselves striking it as they are displaced forwards. It is therefore particularly important that this pressure is built up as efficiently as possible for restraining purposes. This takes place, in particular, through the connection element by means of which, for example, an uncontrolled movement away of the support structure or of the restraining volume is reliably prevented so that the full restraint function can be guaranteed.

It is also advantageous if the deployment unit is designed to deploy the first gas bag and the second gas bag. In particular, provision is therefore made for a single deployment unit which can fill the first gas bag and the second gas bag. For example, this can be carried out via a gas generator or via corresponding pyrotechnics. The deployment of the first gas bag and of the second gas bag can therefore be achieved with fewer components.

It has also proven advantageous if the airbag device has a further deployment unit and the further deployment unit is designed to deploy the second gas bag. In particular, each gas bag can therefore have its own deployment unit which, for example, is generated as a gas generator or through pyrotechnics. In particular, it is therefore possible to ensure that, for example, different activation of the first gas bag and of the second gas bag can also be achieved. For example, these can be triggered successively in time or one after the other. In particular, depending on a seat position of the moveable seat devices, it is possible, for example, depending on the strength of an impact, for the first gas bag or the second gas bag or both together thereby to be deployed accordingly, as a result of which increased safety can be achieved depending on the situation. Furthermore, at least the other gas bag can be deployed even if one of the deployment units fails.

It is likewise advantageous if the airbag device is designed to deploy the first gas bag and the second gas bag independently of one another. In particular, for example, first of all the first gas bag and then the second gas bag can be deployed independently of one another. On this basis, for example, it is possible to ensure that at least the first gas bag is fully inflated, so protection of the occupant can be guaranteed. Improved protection can then be achieved again through the deployment of the second gas bag. In particular, therefore, the deployment of the first gas bag and of the second gas bag can be carried out depending on the situation.

In a further advantageous embodiment, the airbag device is designed to deploy the first gas bag and the second gas bag jointly. For example, provision can then be made for the first gas bag and the second gas bag to be deployed jointly according to a single actuation signal and, for example, according to a single deployment unit. Full protection of the occupant can therefore be achieved in the event of an impact.

According to a further advantageous embodiment, the airbag device has a third gas bag, which in the deployed state, is deployed ahead of the first gas bag and is therefore facing the occupant. In particular, therefore, when viewed in a main direction of travel of the motor vehicle, first of all the backrest, then the second gas bag, then the first gas bag, and then the third gas bag are arranged, wherein the occupant again sits facing the third gas bag. In particular, the third gas bag is inflated separately from the first gas bag. If the distance between the occupant and the front seat is very large, then both gas bags can deploy. If the distance between the occupant and the front seat is very small, then only the first gas bag deploys, with the second gas bag being unable to deploy freely as a result of the early contact with the occupant. Receiving the occupant in the event of an impact can therefore reliably be achieved in the different positions of the seat device.

It has also proven advantageous if the third gas bag is designed as a tubular structure bag. In particular, therefore, a corresponding receiving structure can also be created for the third gas bag so that reliable and safe receiving of the occupant in the event, in particular, of frontal impact can be achieved.

In a further advantageous embodiment, the third gas bag is pneumatically coupled to the first gas bag. For example, the first gas bag and the third gas bag can be pneumatically coupled to one another via a corresponding valve. This enables the third gas bag also to be able to be filled via a single deployment unit of the first gas bag.

A further aspect of the invention relates to a seat device with a backrest part for a motor vehicle comprising at least an airbag device according to the preceding aspect.

A yet further aspect of the invention relates to a motor vehicle with a seat device according to the preceding aspect.

Another independent aspect of the invention relates to a method for operating an airbag device, wherein the airbag device is provided on a backrest part of a moveable seat device of a motor vehicle. A first gas bag of the airbag device is deployed into a receiving position by means of a deployment unit according to an actuation signal, wherein in the receiving position the first gas bag is provided to receive a body part of an occupant of the motor vehicle, and wherein the occupant is facing the backrest part. Provision is made here for the second gas bag to be deployed between the backrest part and the first gas bag at least in the receiving position by means of a second gas bag of the airbag device.

Advantageous embodiments of the airbag device are to be regarded as advantageous embodiments of the seat device, of the motor vehicle and of the method. The airbag device, the seat device and the motor vehicle have, in particular, objective features which enable performance of the method and an advantageous embodiment thereof.

Further advantages, features and details of the invention are set out in the following description of a preferred exemplary embodiment and by reference to the drawing. The features and feature combinations specified in the description above and the features and feature combinations mentioned in the description of the figures and/or shown in the single FIGURE alone below can be used not only in the combination specified in each case, but also in other combinations or on their own without falling outside the scope of the invention.

BRIEF DESCRIPTION OF THE SOLE DRAWING

The single FIGURE here shows a schematic side view in an interior of an embodiment of a motor vehicle with an embodiment of a seat device with an embodiment of an airbag device.

In the FIGURE, identical or functionally identical elements are given the same reference numerals.

DETAILED DESCRIPTION

The single FIGURE shows a schematic side view of an embodiment of a motor vehicle 10 with an embodiment of a seat device 12. The seat device 12 has at least one airbag device 14 and one backrest part 16. For example, the seat device 12 can be designed for a driver of the motor vehicle 10 or for a passenger of the motor vehicle 10. The seat device 12 here is, in particular, stored moveably, in particular moveably in a direction of longitudinal movement 18, so that, for example, the driver of the motor vehicle 10 can assume a corresponding position in the direction of longitudinal movement 18. The seat device 12 has at least the airbag device 14, wherein the airbag device 14 is designed for an occupant 20, wherein the occupant 20 is behind the seat device 12 when viewed in this direction of longitudinal movement 18 and, for example, may be in a back area of the motor vehicle 1.

The airbag device 14 has at least a first gas bag 22, which is deployed into a receiving position 28 by a deployment unit 24 of the airbag device 14 according to an actuation signal, for example from an electronic computer 26 of the airbag device 14, wherein the first gas bag 22 is designed to receive a body part 30, in the present case a head of the occupant 20, wherein the occupant 20 is facing the backrest part 16. The airbag device 14 has at least a second gas bag 32, which, at least in the receiving position 28, is deployed between the backrest part 16 and the first gas bag 22. The first gas bag 22 is designed here, in particular, as what is referred to as a tubular structure bag.

The deployment unit 24 can be designed here, in particular, to deploy the first gas bag 22 and the second gas bag 32. Alternatively, the airbag device 14 can also have a second deployment unit that is designed to deploy the second gas bag 32 separately.

In particular, provision is further made for the airbag device 14 to be designed to deploy the first gas bag 22 and the second gas bag 32 independently of one another. Alternatively, provision can be made for the airbag device 14 to be designed to deploy the first gas bag 22 and the second gas bag 32 jointly.

The FIGURE further shows that the airbag device 14 can also have a third gas bag 34, which is preferably likewise designed as a tubular structure bag, wherein in the deployed state the third gas bag 34 is deployed ahead of the first gas bag 22 and is therefore facing the occupant 20. The third gas bag 34 can be pneumatically coupled to the first gas bag 22 here.

In particular, an airbag device 14 for the back area of the motor vehicle 10 is therefore provided which, in particular, is arranged on the front seat, in particular on the backrest part 16, and still offers a safe receiving basis for the occupant 20 through its ability to be moved in the direction of longitudinal movement 18, even when there are different distances from the backrest part 16. In particular, it is proposed here that the second gas bag 32, which makes the distance adjustment, be arranged between the backrest part 16 and the first gas bag 22.

By way of addition, the third gas bag 34 can be provided that is likewise designed as a structured airbag and has corresponding tubes and receiving bodies in the further area and can likewise fill an even further open space. In particular, provision can be made here for the first gas bag 22 and the third gas bag 34, which are both preferably designed as tubular structure bags, to be pneumatically coupled and, for example, to be separated from one another only via valves or throttles so that joint filling can be carried out. However, the third gas bag 34 can be filled here with a time delay after the first gas bag 22.

In particular, provision can be made for at least the first gas bag 22 and the second gas bag 32 to be able to be filled jointly with one another and, for example, also to have the deployment unit 24 which, for example, is designed as a gas generator or as pyrotechnics. Alternatively, each of the gas bags 22, 32, 34 can also have its own deployment unit 24. Furthermore, it is also possible for the respective deployment units 24 to be activated in a single stage so that the first gas bag 22 and the second gas bag 32, for example, can deploy simultaneously or can deploy in an identical manner. Alternatively, a multi-stage variant is also possible, wherein, the first gas bag 22 and the second gas bag 32 can then correspondingly be filled after this via valves, for example, via an increase in volume or an increase in pressure. In particular, provision can be made here, for example, for the first gas bag 22 to be filled first of all and then the second gas bag 32 to be filled in multiple stages.

If there are two or more deployment units 24, these can likewise be activated jointly, wherein jointly is to be understood, in particular, to mean simultaneously, or alternatively in two or more stages, so that, for example, the first gas bag 22 is always deployed, but the second gas bag 32 is only deployed according to other parameters and then the deployment time or a start of deployment can also be carried out depending thereon. The seat adjustment of the seat device 12 and primarily the position of the backrest 16 in the direction of travel, in particular whether it has moved in a longitudinal direction, can similarly be used here as variables influencing the activation of the second gas bag 32 if they are available. As already described, the activation can also take place without additional information or parameters so that the second gas bag 32 is only controlled according to the activation of the first gas bag 22 in an "unsensed" manner, so to speak.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCES

10 Motor vehicle
12 Seat device
14 Airbag device
16 Backrest part
18 Direction of longitudinal movement
20 Occupant
22 First gas bag
24 Deployment unit
26 Electronic computer
28 Receiving position
30 Head
32 Second gas bag
34 Third gas bag

The invention claimed is:

1. A seat device for a motor vehicle, the seat device comprising:
   a backrest part;
   an airbag device arranged on the backrest part of the seat device, wherein the airbag device comprises
   a first gas bag configured to be deployed into a receiving position by a deployment unit of the airbag device according to an actuation signal, wherein in the receiving position the first gas bag is configured to receive a body part of an occupant of the motor vehicle, wherein the occupant is facing the backrest part and the occupant is behind the seat device when viewed in a direction of longitudinal movement of the seat device;
   a second gas bag, which at least in the receiving position, is configured to be deployed between the backrest part and the first gas bag, wherein the first gas bag is a tubular structure bag that consists of an actively filled tubular structure and a valve film; and
   a third gas bag, which in the deployed state, is configured to be deployed ahead of the first gas bag and is facing the occupant.

2. The seat device of claim 1, wherein the deployment unit is configured to deploy the first gas bag and the second gas bag.

3. The seat device of claim 1, wherein the airbag device has at least one further deployment unit and the further deployment unit is configured to deploy the second gas bag.

4. The seat device of claim 1, wherein the airbag device is configured to deploy the first gas bag and the second gas bag jointly.

5. The seat device of claim 1, wherein the third gas bag is a tubular structure bag.

6. The seat device of claim 1, wherein the third gas bag is pneumatically coupled to the first gas bag.

7. A seat device for a motor vehicle, the seat device comprising:
   a backrest part;
   an airbag device arranged on the backrest part of the seat device, wherein the airbag device comprises
   a first gas bag configured to be deployed into a receiving position by a deployment unit of the airbag device according to an actuation signal, wherein in the receiving position the first gas bag is configured to receive a body part of an occupant of the motor vehicle, wherein the occupant is facing the backrest part and the occupant is behind the seat device when viewed in a direction of longitudinal movement of the seat device;
   a second gas bag, which at least in the receiving position, is configured to be deployed between the backrest part and the first gas bag, wherein the first gas bag is a tubular structure bag that consists of an actively filled tubular structure and a valve film; and
   a third gas bag, which in the deployed state, is configured to be deployed ahead of the first gas bag and is facing the occupant,
   wherein the airbag device is configured to deploy the first gas bag and the second gas bag independently of one another.

8. A method for operating a seat device for a motor vehicle, wherein the seat device comprises a backrest part and an airbag device, comprising first, second, and third gas bags arranged on the backrest part of the seat device, wherein the method comprises:
   deploying, responsive to an actuation signal, the first gas bag into a receiving position by a deployment unit of the airbag device, wherein in the receiving position the first gas bag is configured to receive a body part of an occupant of the motor vehicle, wherein the occupant is facing the backrest part and the occupant is behind the seat device when viewed in a direction of longitudinal movement of the seat device;
   deploying the second gas bag, which at least in the receiving position, is configured to be deployed between the backrest part and the first gas bag, wherein the first gas bag is a tubular structure bag that consists of an actively filled tubular structure and a valve film; and
   deploying the third gas bag ahead of the first gas bag, wherein the third gas bag faces the occupant.

* * * * *